April 16, 1929.  A. TORRIANI  1,709,290
LARGE OUTPUT EXPRESS COFFEE MACHINE
Filed June 29, 1927
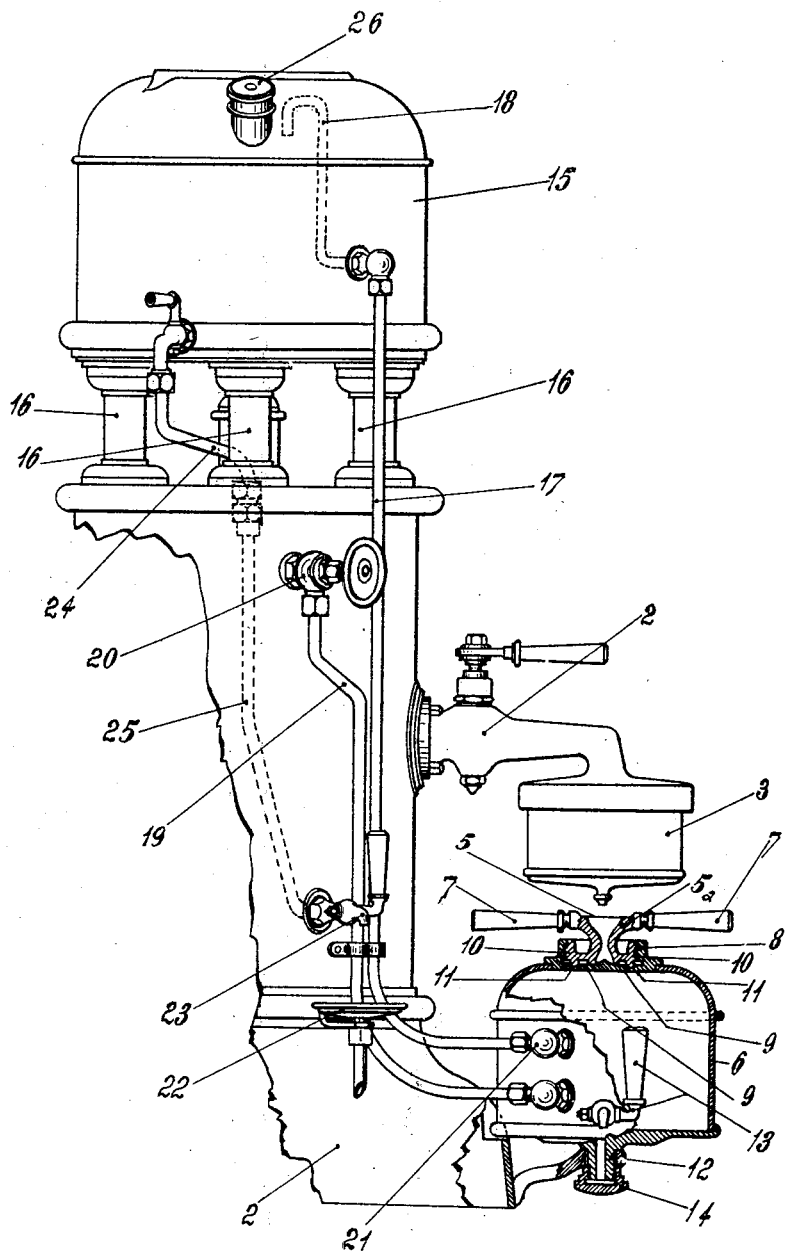
A. Torriani
INVENTOR
By: Marks & Clark
Attys.

Patented Apr. 16, 1929.

1,709,290

UNITED STATES PATENT OFFICE.

ANGELO TORRIANI, OF PAVIA, ITALY.

LARGE-OUTPUT EXPRESS COFFEE MACHINE.

Application filed June 29, 1927, Serial No. 202,338, and in Italy April 22, 1927.

The present invention relates to a large output express coffee machine.

The express coffee machines thus far known comprise an electrically or gas heated boiler for the production of steam, the boiler being connected to the so called distributing groups. Each distributing group consists of an arm fixed to the machine casing or shell and intended to receive a filter-carrier in which the ground coffee is put, so that when steam is admitted into the filter chamber the steam passes through the layer of coffee dust from which it extracts the aromatic principles; the steam then issues in form of drinking coffee and is received in cups for distribution to the customers. The distribution capacity of such machines is very limited, so that when the concourse of customers in bars and the like is large, the machine is quite uncapable to keep pace with the demands; hence a congestion in the shops and a slow service.

It has occurred that if the express machine were equipped with a reserve supply of ready made coffee against the periods of greater demand recurring during the day, the above mentioned serious inconvenience would be overcome and express coffee machines could be adopted even by such concerns as have to cope with numerous simultaneous demands for coffee.

The machine according to the invention essentially distinguishes itself by the fact that it comprises a filtering device of considerable capacity supplying with coffee infusion a collector that acts as a reservoir. From this collector the coffee infusion can either be discharged direct into the cups for immediate distribution, or it can be conveyed by steam pressure into a reserve tank suitably combined with the machine.

The apparatus forming the object of the invention is schematically illustrated in one of its execution forms by the annexed drawing consisting of a single figure and being a partial elevation of the machine with partial sections of the characteristic parts.

Referring to the drawing, 1 is the machine casing or shell; the machine comprises a boiler of any known type, located on a pedestal —2— and equipped with the ordinary groups for the preparation of express coffee; these groups are not shown on the drawing as they do not form part of the invention.

On the casing —1—, the arm —2ª— is fixed for the characteristic group of the present invention, the group comprising a filter-carrier —3— of considerably larger size than usual. The arm 2ª carries a valve 2ᵇ by means of which steam or hot water may flow to the filter carrier 3. The coffee infusion issuing from the outlet —4— of the said group drops into the funnel —5— of the collector —6—, the collector capacity being designed to suffice to fill a large number of cups. The funnel —5— is formed in one with the plug —5ª— fitted with handles —7— and screwed into a seat —8— provided in the cover of the collector —6—. In the bottom of the seat —8—, slots —9— are formed which are in permanent communication with the inside of the collector —6— and may also communicate with the funnel —5—, viz when the plug —5ª— is not tightly screwed down into its seat —8—. A certain clearance is left between the circular projections —10— of the plug and the corresponding packings —11—, so that when the plug —5ª— is tightly screwed down, the projections —10— in conjunction with the packing —11— shut up the communication between the collector —6— and the funnel —5—. The collector —6— is fitted with an outlet duct —12— controlled by a cock —13— and closed by a screw cap —14—; the collector —6— is further fitted with a gauge (not shown in the drawing) indicating at any time the amount of liquid present in the collector —6—.

The collector —6— represents a moderately capacious reservoir that can supply the necessary amount of coffee infusion at moments of higher demand, viz when the usual number of distributing groups is not sufficient to cope with the requests. When however a still larger demand is to be provided, this could be met by the larger reservoir —15— arranged at the top of the machine and carried on the columns —16— or equivalent. The larger reservoir —15— is fed with coffee infusion from the collector —6— in the following manner. The collector —6— is connected to the reservoir —15— by a pipe —17— delivering into the latter through an extension —18— provided inside of 15. A further pipe —19— controlled by a cock —20— takes the steam from the boiler and delivers it into the collector —6— at —21—. The liquid present in collector —6— is forced, by the pressure of the entering steam, up the pipe —17— and into the reservoir —15—; a gauge provided on —15— and not shown in the drawing indicates at any time the amount of coffee infusion present in the reservoir —15—.

When needed, coffee is distributed from the reservoir —15— into the cups (that are placed on the supporting plate 22) through cock —23— and pipe —24—, this pipe being led through the boiler at —25— so that the coffee may be heated on its way from —15— to the cups. A plug —26— provided in the ceiling of —15— gives access to the inside of the reservoir for the necessary inspections.

Of course the details of the machine are not confined in actual practice to those described and illustrated. For instance, machines may be manufactured in which no reservoir —15— is provided, or machines with more than one collector —6—; the reservoir —15— may be mounted separately from the machine; there might be more than one set —2—6; the filter-carrier —3— might be provided with several outlets —4— delivering into a single funnel —5— or into several funnels —5—, and the funnels may all be formed in the same plug —5ª— or each in separate plugs of separate collectors —6— and so on, without departing from the spirit and scope of the present invention.

What I claim and desire to secure by United States Letters Patent is:

1. In a coffee making machine, a boiler, a coffee filter chamber connected to said boiler, an outlet opening for said chamber, a coffee collector positioned beneath said chamber and having an opening in alignment with said outlet opening for receiving coffee from said filter, and a valve for closing communication between said chamber and said collector.

2. A coffee making machine according to claim 1 wherein the valve has a funnel-like portion for guiding coffee from the filter outlet into the collector.

3. In a coffee making machine, a boiler, a coffee filter chamber connected to said boiler, a coffee collector for receiving coffee from said filter, a reserve tank, and means comprising a steam pipe connection between said boiler and said collector for forcing coffee from said collector to said reservoir.

4. In a coffee making machine, a boiler, a collector, a reservoir, and means comprising a steam pipe connection between said boiler and said collector for forcing coffee from said collector into said reservoir.

5. A coffee making machine comprising a coffee collector and a coffee reservoir and a source of steam under pressure connected to said collector for forcing coffee from said collector into said reservoir.

6. A coffee making machine comprising a steam boiler, a coffee filter connected to said boiler, a coffee collector mounted under said filter and having an opening for receiving coffee from said filter, a valve for closing said opening, a reservoir mounted on top of said boiler, a pipe connected between the top of said collector and the steam space of said boiler, a valve in said pipe, and a pipe connected between the bottom of said collector and the top of said reservoir.

7. In a coffee making machine, a valve comprising a seat having perforations therein, a valve member screw threaded to said seat and having a funnel-like opening therethrough, said opening being adapted to communicate with said perforations when the valve is in open position.

8. In a coffee making machine, a source of steam, a primary coffee reservoir, a secondary coffee reservoir, a coffee filter, means for passing said steam through said filter to prepare an infusion, and means for forcing prepared coffee from one reservoir to another and including steam from said source.

9. In a coffee making machine, a primary coffee reservoir, a secondary coffee reservoir, a filter chamber leading to the primary reservoir, means for admitting steam into said filter to prepare an infusion therein, and means including a source of steam for forcing coffee from said primary reservoir to said secondary reservoir.

10. In a coffee making machine, a steam boiler, a filter, a primary coffee reservoir, a secondary coffee reservoir, means for admitting steam from said boiler to said filter to prepare an infusion therein, and means for admitting steam into said primary reservoir to force prepared coffee therefrom into said secondary reservoir.

11. In a coffee making machine a source of steam, a filter chamber, a primary coffee reservoir, a secondary coffee reservoir, a valve between said filter chamber and said source, a valve between said filter and said primary reservoir, and means comprising said steam source for forcing coffee from said primary reservoir to said secondary reservoir.

Signed at Milan, (Italy), this 27th day of May, 1927.

ANGELO TORRIANI.